Figure 1:
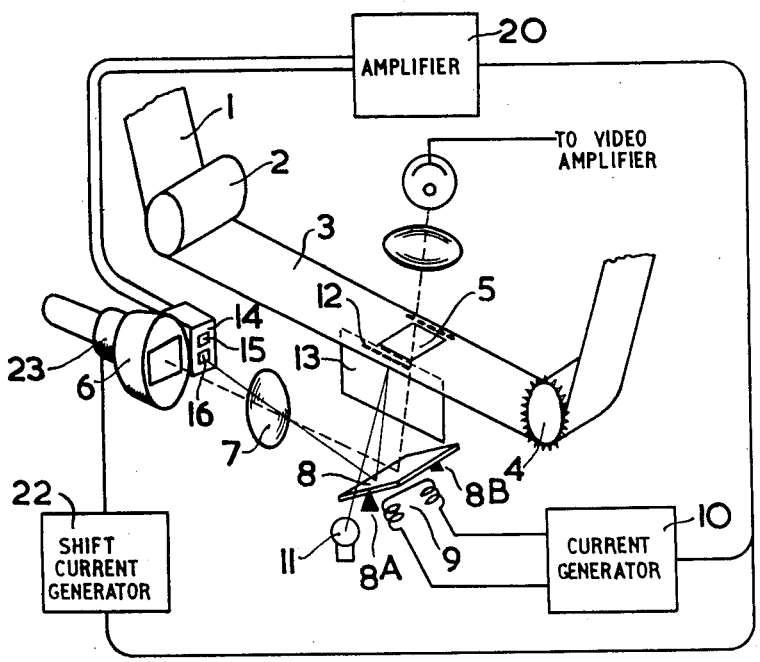

Dec. 4, 1962   J. L. E. BALDWIN   3,067,284
APPARATUS FOR DERIVING TELEVISION SIGNALS
FROM CINEMATOGRAPHIC FILM
Filed Jan. 4, 1961   4 Sheets-Sheet 1

INVENTOR
JOHN LEWIS EDWIN BALDWIN

BY Hane and Nydick
ATTORNEYS

Dec. 4, 1962  J. L. E. BALDWIN  3,067,284
APPARATUS FOR DERIVING TELEVISION SIGNALS
FROM CINEMATOGRAPHIC FILM
Filed Jan. 4, 1961  4 Sheets-Sheet 3

INVENTOR
JOHN LEWIS EDWIN BALDWIN

INVENTOR
JOHN LEWIS EDWIN BALDWIN

United States Patent Office 3,067,284
Patented Dec. 4, 1962

3,067,284
APPARATUS FOR DERIVING TELEVISION SIGNALS FROM CINEMATOGRAPHIC FILM
John Lewis Edwin Baldwin, Croydon, England, assignor to Bush and Rank Cintel Limited, London, England
Filed Jan. 4, 1961, Ser. No. 80,653
Claims priority, application Great Britain, Jan. 11, 1960
5 Claims. (Cl. 178—7.2)

A long-standing difficulty in telecine apparatus, that is apparatus for scanning cinematographic film to derive television signals, is the necessity for moving the film at a speed which is fixedly related to the scanning rate. Where scanning at 50 fields per second is employed, for example, it is usual to run the film at 25 frames per second, although it is intended to be projected at 24 frames per second. To avoid this difficulty it has therefore been proposed to use apparatus in which the film is traversed with uniform velocity. It then becomes necessary to provide means for producing on the moving film an image of a scanned area which shall remain exactly in register with one film frame during scanning and shall then be displaced to a position in register with the next succeeding film frame. A number of different forms of apparatus for performing this function have been described using mechanically moved optical elements for producing the required movement of the image. Many of these previously described systems have required complex optical systems with a disadvantageously low efficiency while others have used elements moved by cams so that their intrinsic accuracy of registration was limited by mechanical considerations. In one such system, described by A. G. Jensen, R. E. Graham, and C. F. Matthe in an article published in "Journal of the Society of Motion Picture and Television Engineers," volume 58, pages 1–21, an image of the scanned screen of a cathode ray tube is held stationary on the film by a succession of cam-tilted mirrors and an auxiliary mirror is included in the optical path. The position of this auxiliary mirror is controlled by a signal indicating any error in registration of an image of the sprocket holes in the film to compensate for any positional error due to cam wear and the like. This arrangement has the disadvantage of inherently limited intrinsic accuracy already noted and adds to this the necessity for including an additional reflector in the optical path.

It is therefore an object of the present invention to provide telecine apparatus in which a single mirror only is used in the optical path.

It is also an object of the invention to provide telecine apparatus in which the accuracy of registration shall not be limited by the use of mechanical cam and follower devices for controlling optical members.

A further object of the invention is to provide telecine apparatus in which registration of a scanned area upon the film is controlled directly from the film perforations.

Still another object of the invention is to provide telecine apparatus in which any residual error in registration upon a film of an image of an area scanned by an electron beam may be corrected by deflection of the electron beam.

Figure 2:
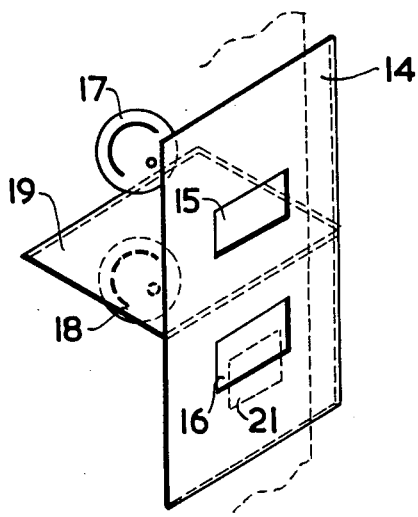
Figure 3:
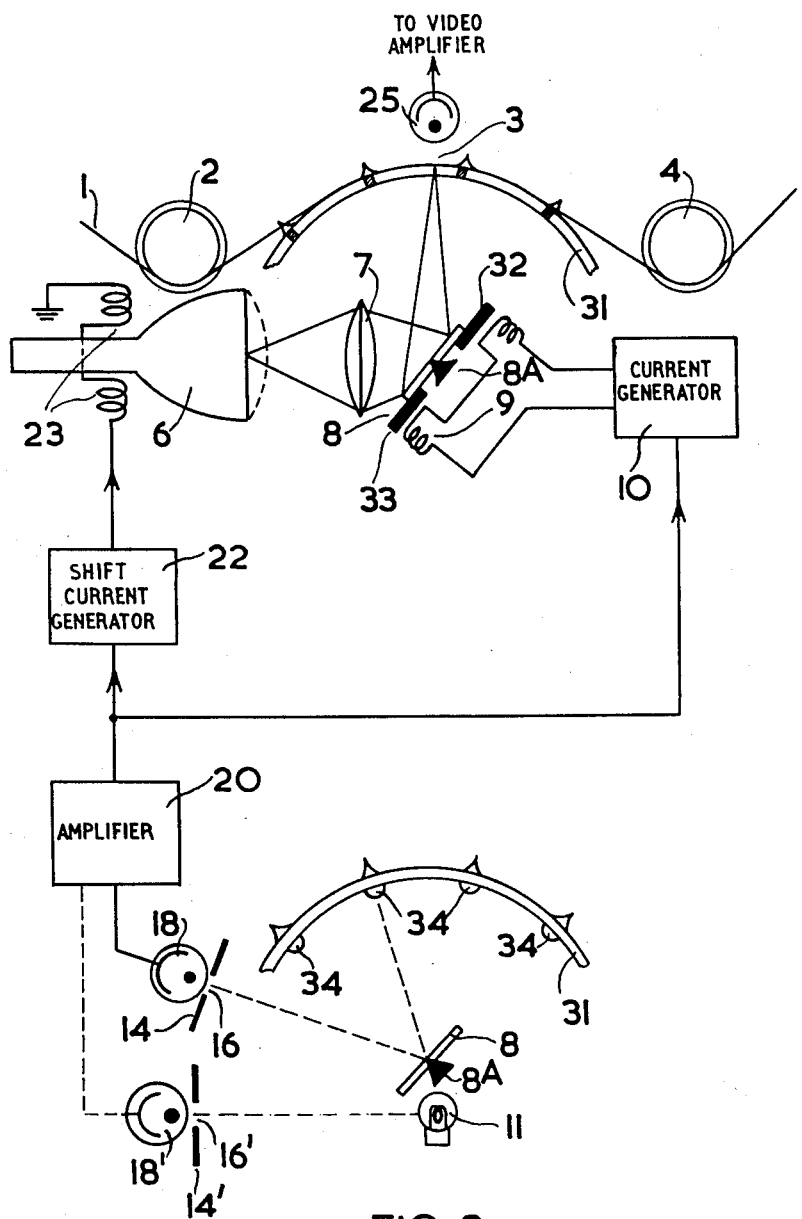
Figure 4:
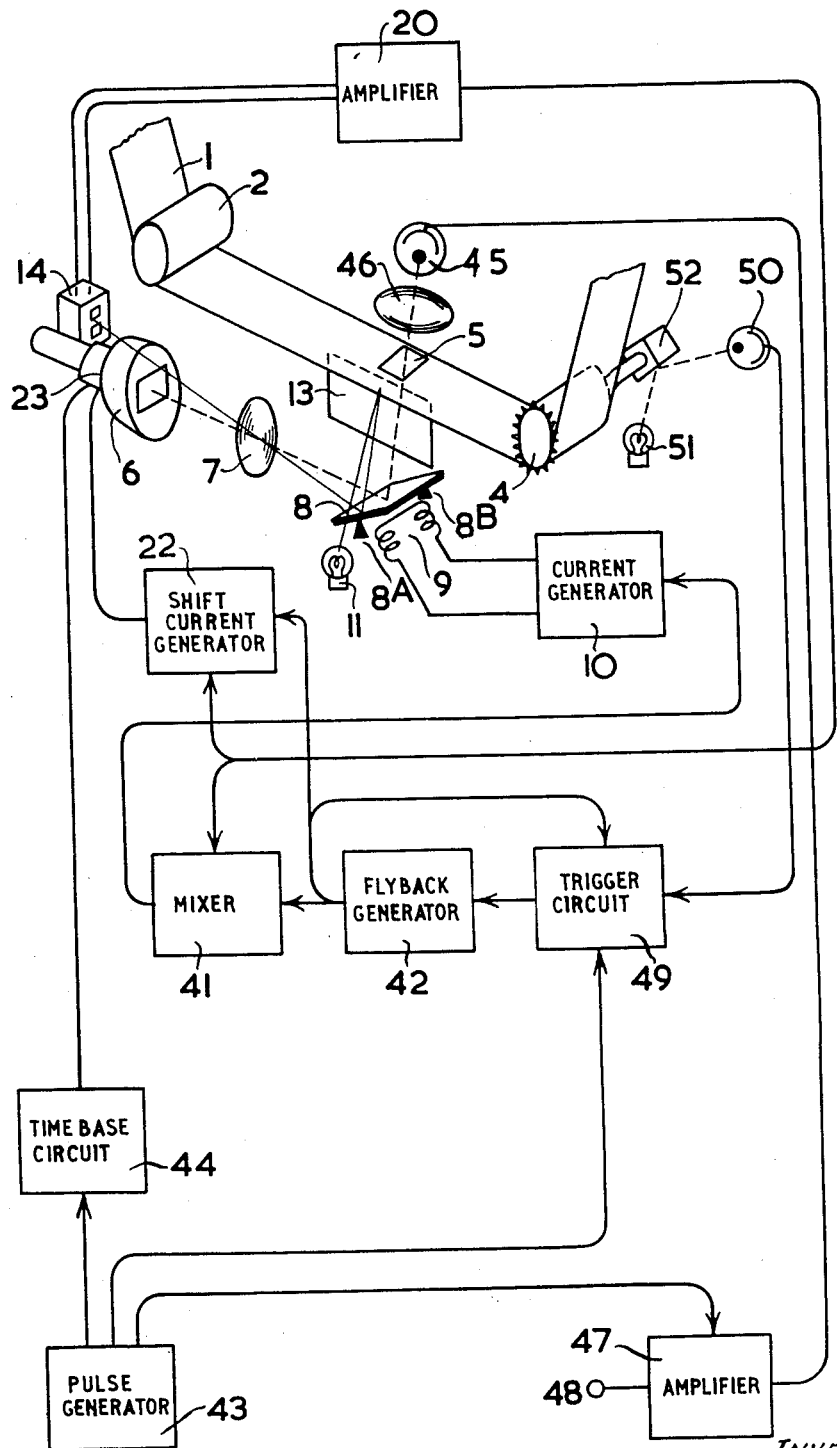
Figure 5:
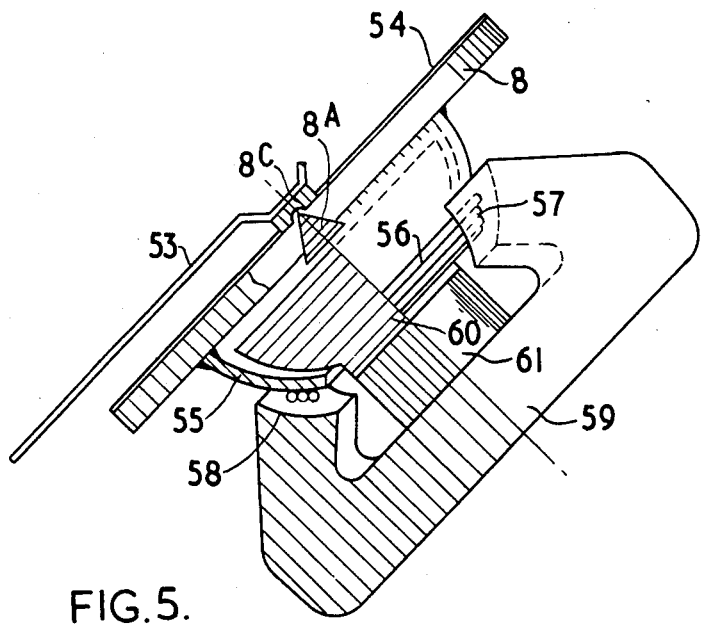
Figure 6:
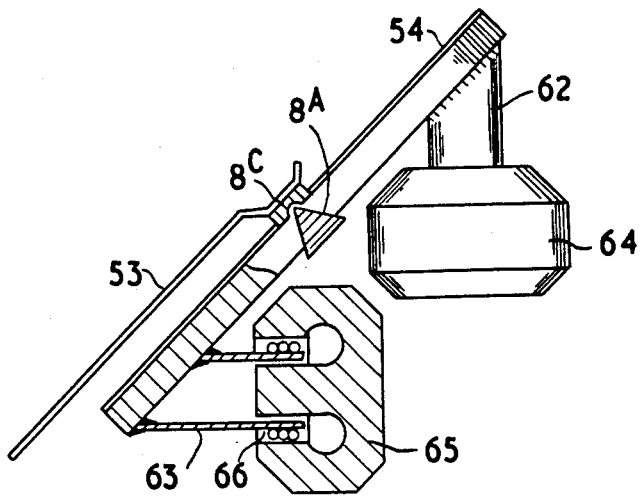

The features of this invention which are believed to be novel are set forth with particularity in the appended claims. The organization and manner of operation of the invention together with further objects and advantages thereof, may best be understood with reference to the following description taken in conjunction with the accompanying drawings in which like reference numerals refer to like elements in the several figures, and in which:

FIGURE 1 is a schematic diagram illustrating one embodiment of the invention,

FIGURE 2 is a detail illustrating more clearly an element of the apparatus shown in FIGURE 1, FIGURE 3 is a schematic diagram illustrating another embodiment of the invention, FIGURE 4 is a schematic diagram illustrating yet another embodiment of the invention, FIGURE 5 is a part-sectional view of one embodiment of electromagnetic device suitable for incorporation in embodiments of the invention, FIGURE 6 is a part sectional view of an alternative embodiment of electromagnetic device suitable for incorporation in embodiments of the invention, and FIGURE 7 is a circuit diagram of apparatus for performing some of the functions of elements of the embodiments of the invention described in relation to FIGURES 1, 3 and 4.

In all these drawings only those elements essential to the comprehension of the invention are shown and similar elements appearing in the several figures bear the same reference numerals.

In the apparatus shown in FIGURE 1 a cinematographic film 1 is drawn from a feed spool (not shown) and passes over a guide roller 2 through a gate 3 in which it is accurately positioned by conventional means (not shown) and then passes over a traction sprocket 4 to a feed spool (not shown). In gate 3, film 1 has projected upon it at 5 an image of a pattern scanned on the screen of a cathode ray tube 6. This image is projected upon the film by means of a suitable optical system, shown for the sake of convenience in illustration as a single lens 7, and a reflector 8 which may be rocked about an axis parallel to the plane of the film in the gate and perpendicular to its direction of movement. This axis is conveniently established by means of knife edge supports shown schematically at 8A, 8B. The movement of reflector 8 is controlled by suitable electromagnetic means illustrated schematically as a pair of coils 9 to which current is fed by a voltage-controlled current generator 10. The signals applied to control current-generator 10 are derived by means sensitive to any registration error between the image of the scanned area projected by reflector 8 and the film frame as will now be described.

A light source 11, which may conveniently be a conventional exciter lamp, is arranged to illuminate the edge of film 1, containing the perforations 12, but not to illuminate that part of the film containing the picture frames. This may be arranged, for example by interposing a suitably formed optical shield 13 between lamp 11 and the picture frames. Light reflected from the film is reflected also by reflector 8 and passes through optical system 7 to fall upon a masking box 14. This box, as is more clearly shown in FIGURE 2, is pierced by two apertures 15, 16. Light passing through the two apertures falls respectively upon two photoelectric cells or other suitable electrically light-sensitive devices 17, 18. A screening member 19 prevents light passing through either aperture from illuminating the wrong photocell.

Signals developed in the two photocells as a result of any variation in illumination are passed to a difference amplifier 20 of suitable known type which yields as output signal a voltage proportional to the difference in the illumination of the two photocells. The size and disposition of apertures 15, 16 in relation to the image of the edge of film 1—which is indicated in FIGURE 2 in broken line—is such that photocell 17 is illuminated by light from an unperforated part of film, while photocell 18 receives light from a part of the film which contains a perforation, the image of which is indicated at 21. The difference signal developed in amplifier 20 is applied to current generator 10, where its polarity is such as to produce a movement of reflector 8 tending to stabilize the image of the scanned area on the film frame.

Initially the illumination of photocells 17, 18 may be the same, or that of cell 18 may be less, since it receives the image of a part of the film which includes a sprocket hole. The value of output signal is preferably zero when half the image of a sprocket hole falls upon photocell 18, and in any case the output under these conditions is arranged to produce no effect upon current generator 10. When the amount of the image of a perforation which falls upon photocell 18 varies, however, a difference signal is generated which causes generator 10 to produce a current tending to tilt reflector 8 in a direction such that the image of the perforation is appropriately moved in relation to aperture 16. Since the film is in continuous movement the current which generator 10 must generate to maintain the same illumination of photocell 18 will continuously increase and the tilt of the mirror will follow the movement of the film, thus ensuring that the image of the screen of cathode ray tube 6 is kept in register on the film frame.

Generator 10 must also contain circuits, such as those described later in relation to FIGURE 7, which at appropriate times produce a flyback deflection of mirror 8 to cause the scanning of the next film frame in succession.

It is, in addition, advantageous to apply the error signal developed in amplifier 20 to a current generator 22 which feeds current to deflector coils, contained in a deflection yoke 23 surrounding the neck of cathode ray tube 6, the field produced by which shifts the scanned area on the screen of the tube in a direction such as to reduce the registration error to zero. It will be appreciated that the action of this additional corrector arrangement is instantaneous, whereas the effect of deflection-correcting signals applied to the reflector drive coils 9 cannot be instantaneous because of the finite inertia of the reflector.

In the apparatus shown in FIGURE 3 a cinematographic film 1 is drawn from a feed spool (not shown) and passes over a guide roller 2 on to the circumference of a transport sprocket 31, of which a fragment only is shown. On leaving sprocket 31 film 1 passes over a second guide roller 4 to a take-up spool (not shown). Sprocket 31, which is arranged by suitable conventional means (not shown) to be rotated with uniform angular velocity, is peripherally apertured or otherwise so constructed that the whole of each frame of the film is exposed to light projected upon the film from the screen of a cathode ray tube 6 by means of a suitable lens system, represented for convenience in illustration as a single lens 7, and a reflector 8. This reflector is best formed as a front-surface mirror and is mounted for oscillatory movement about an axis in or near its reflecting surface, parallel to and preferably substantially coincident with that about which sprocket 31 rotates. The oscillatory movement of reflector 8 is controlled by electromagnetic means; conveniently it may, as illustrated, be provided with two armatures 32, 33 each of which is placed within the magnetic field of one of two electromagnetic systems illustrated as a pair of coils 9 which are fed from a voltage-controlled current generator 10, with currents such that the reflector is deflected in one direction with substantially uniform velocity to keep the image of the scanned area in register with the moving film and returned to register the image upon a subsequent film frame only during a flyback interval of the scanning process.

The voltage which controls current generator 10 in this embodiment of the invention is developed by the arrangement shown in the lower part of the figure. Sprocket 31, which is here repeated for convenience in illustration, carries a series of fiducial elements 34, which are each adapted to reflect light from a source indicated as an incandescent lamp 11 towards reflector 8 and thence to an apertured mask 14 pierced by an aperture 16 behind which is placed a photocell 18. Light from source 11 also falls directly upon a mask 14' pierced by an aperture 16' behind which is placed a photocell 18'. Photocells 18, 18' are connected to a conventional circuit 20 in which are developed signals proportional to the difference between the photocurrents supplied by the two photocells.

The elements 34, are disposed on sprocket 31 at intervals corresponding to the height of one film frame, that is, one per tooth for 16-mm. film or for every fourth tooth for 35-mm. film. The element should be such as to provide at mask 16 an image of which the displacement relative to the mask produced by any error in registration due to incorrect positioning of reflector 8 yields a change in current in photocell 18 which is proportional in amount to the error and of which the direction of change corresponds to that of the error. Thus each element 34 may comprise a plane reflector by which an image of an illuminated aperture is projected upon reflector 8.

It will sometimes be advantageous to arrange that each element 34 is adjustable in position relative to the body of sprocket 31, over a small range, so that allowance may be made for inaccuracies in the positioning of the sprocket teeth during manufacture.

It will usually be advantageous to arrange that the amplified error signal from amplifier 20 is applied to a current generator 22 which supplies a current proportional to the error to deflector coils 23 associated with cathode ray tube 6. These coils are arranged to shift the pattern scanned on the screen of the cathode ray tube in the direction corresponding to that of the deflection produced by movement of reflector 8. The amplitude of the deflection produced by the current from generator 22 flowing in coils 21 is arranged to correct for any error in the relative positions of reflector 8 and sprocket 31.

It will be appreciated that although the apparatus so far described with reference to FIGURES 1 to 3 enables reflector 8 to be deflected so as to keep the image of the screen of cathode ray tube 6 substantially in register upon film 1 during the scanning of one frame, the provision for arranging that the image can be transferred to the next subsequent frame has not yet been fully described. This operation may be performed as described below.

Means are provided which are sensitive to the position in the scanning gate of the image of the screen of cathode ray tube 6 which is reflected in to the gate by reflector 8 and which develop a priming signal whenever this position is such that the distance between the edge of the image and the beginning of the gate, by which is meant the extreme range in the direction of film travel over which it is possible for reflector 8 to deflect the image of the screen, is greater than the height of the image, that is, greater than one frame height.

Means are also provided which develop an initiating signal whenever a field flyback occurs on the scanning tube 6. Both priming and initiating signals are applied to a trigger circuit in such a manner that this circuit provides an output pulse only when an initiating signal occurs after a priming signal. The output pulse from the trigger will be developed, therefore, whenever the end of scanning of one field occurs at a time when the frame succeeding that just scanned is wholly within the scanning gate. This output pulse is applied to cause a voltage generator to develop a flyback signal such that when applied to the current generator which feeds the deflection-control coils for the reflector it produces in these coils a change of current which moves the image on the film by one frame height in the direction opposite to that in which the film moves, so that the scanning of the next frame may commence. The duration of this flyback signal must obviously be less than the field blanking interval of the television signals.

An embodiment of apparatus incorporating this feature is illustrated by FIGURE 4 of the drawings. As may be seen the apparatus of this embodiment is generally similar to that of FIGURE 1 and the description given in relation to that figure will not be repeated. In this modified embodiment of the invention, however, correcting signals derived from amplifier 20 are not fed directly to current generator 10 but are applied to a mixer circuit 41 in which they may be combined with signals, developed by a flyback generator 42, which are such as to displace the image of the scanned area on the film in the direction opposite to that of film movement by one frame height.

Flyback generator 42 is required to develop an output signal at the end of the first frame scanning interval occurring after the film frame subsequent to that being scanned has moved to a position wholly within the scanning gate. In the embodiment of FIGURE 4 this requirement is met as follows.

Synchronizing signals are generated in a conventional pulse generator 43 and are applied to control the action of time-base circuits 44 of conventional type which feed to deflector 23 of cathode ray tube 6 currents such as to produce the desired scanning pattern on its screen. The pattern thus scanned is imaged at 5 on film 1 by way of reflector 8 and yields in a photocell 25, upon which light passing through the picture area of the film is projected by means of a suitable collecting lens 46, signals corresponding with the scanning of the film. These signals are fed to an amplifier 47 in which there are added to them appropriate blanking, or blanking and synchronizing signals also developed by pulse generator 43. The blanked picture signal or the television signal from amplifier 47 is taken from an output terminal 48 for use as desired.

Field synchronizing pulses from pulse generator 43 are also applied as trigger signals to a conventional bistable trigger circuit 49, which remains in a first stable condition until it receives both a priming and a trigger signal. The priming signals applied to trigger circuit 49 are derived from a photocell 50 upon which light from a suitable source such as an incandescent lamp 51 is directed by each face in turn of a glass prism 52 mounted upon the shaft of sprocket 4 by which the film is drawn through the scanning gate. The number of faces on prism 52 is chosen equal to the number of film frames which would cover the circumference of sprocket 4 and the angular position of prism 52 in relation to the sprocket is such that light from source 51 falls upon photocell 50 only at times when the film frame subsequent to that upon which the image 5 of the scren of cathode ray tube 6 is currently projected has wholly entered the scanning gate.

Thus the first field synchronizing signal which occurs after the frame next to that being scanned has wholly entered the scanning gate will cause trigger circuit 49 to assume its second stable condition. In making this transition trigger circuit 49 generates an impulse which is applied to initiate a cycle of operation of flyback generator 42, which then supplies to mixer circuit 41 a signal which produces a deflection of reflector 8 such as to direct the image 5 of cathode ray tube 6 upon the frame next to be scanned. It will be found necessary to apply a signal developed by flyback generator 42 to circuit 22 or to some other part of the feedback loop to the cathode ray tube deflection arrangements in such a manner as to prevent this loop being operative during the application of the flyback signals to the reflector drive coils 9. A signal from flyback generator 42 is also applied to trigger circuit 49 at the end of the flyback operation so as to return this circuit to its first stable condition ready to produce the next flyback.

FIGURE 5 shows one embodiment of an electromagnetic arrangement which may be employed for rocking mirror 8. The mirror is mounted by V-grooved agate members, of which one only is shown at 8C which are secured to the mirror face so that the apices of their grooves are in the plane of the mirror reflecting surface formed by the reflective coating 54 deposited on the support 8. These grooved members engage the apices of agate knife-edge members, of which one only is shown at 8A, which are themselves supported by suitable mounting members (not shown). A leaf-spring 53, suitably mounted to a part of the framework of the apparatus (not shown) bears upon member 8C to keep the knife-edge engaged in the groove and to tend always to restore the mirror to a predetermined position.

To the back of mirror 8 is secured a hollow, part-spherical insulating member 55 upon which is wound a coil 56 to which current may be conveyed by suitable leads (not shown). Adjacent to opposite sides of coil 56 are the concavely spherically-curved pole-pieces 57, 58 of a permanent magnet 59 which are concentric with member 55. Within coil former 55 is disposed a highly permeable ferromagnetic member 60 which is formed to approach closely to the former 55 and is supported from magnet 59 by a spacer 61, preferably of non-magnetic materials.

When a current is fed to coil 56 the forces developed as a result of the interaction of the current with the field of magnet 59 will produce a couple which rocks the mirror in one or the other direction from its neutral position. Coil 56, of course, corresponds to the coils 9 of FIGURES 1, 3 and 4.

In the alternative embodiment of electromagnetic means for rocking mirror 8 which is shown in FIGURE 6 the mirror-supporting arrangement is identical with that of FIGURE 5 and will not, therefore, be again described. To the back of mirror 8 are secured two tubular members 62, 63 which are so placed that their axes are tangential to a circle centred in the pivot axis of the mirror. Each of these members carries a coil working in the gap of one of two annular magnets 64, 65. One only of these coils is visible at 66. Suitable flexible connecting leads (not shown) conduct current to the coils, which are preferably made identical and connected in series. The coils of which coil 63 is one correspond to the coils 9 of FIGURES 1, 3 and 4.

One embodiment of circuit means suitable for carrying out the functions of flyback generator 42 and trigger circuit 49 of FIGURE 4, and of the similar circuits which are included within device 10 of FIGURES 1 and 3, is illustrated in FIGURE 7 and will be described with reference to its inclusion in the apparatus of FIGURE 4. The circuit arrangement here illustrated receives at its input terminal 71 positive-going pulses from pulse generator 43 of FIGURE 4 which occur during the flyback interval of the scanning operation performed by cathode ray tube 6 in that figure. These pulses are differentiated at the grid of valve 72 of a trigger pair of valves 72, 73, of which the latter valve is operative when the circuit is quiescent. The positive-going differentiated spike applied to the grid of valve 72 causes that valve to become operative and valve 73 to be cut off, so that a positive-going pulse is generated at the anode of valve 73 and persists until the trigger circuit 72, 73 is restored to its initial condition.

The positive-going pulse developed at the anode of valve 72 is applied to the grid of valve 74 of a trigger pair of valves 74, 75. The grid of valve 75 is returned by way of a variable resistance 76 to the positive supply line and is connected by way of the anode/cathode path of a diode 77 to the junctions of two resistors 78, 79 connected across the supply and so dimensioned that the potential at the cathode of diode 77 is somewhat more positive than the most positive potential applied to the grid of valve 74 when the circuit is in operation. In the quiescent state of the circuit valve 75 therefore conducts while valve 74 is cut off. When the positive-going impulse arising at the anode of valve 73 is applied to the grid of valve 74, this valve cannot immediately conduct since, as has already been stated, the grid of valve 75 is held by diode 77 at a somewhat higher potential than that to which the grid of valve 74 is driven by the pulse from valve 73.

The grid of valve 75 is also connected to the junction of resistors 78, 79 by way of the anode-cathode path of a further diode 80 and a resistor 81. The cathode of diode 80 is also connected by way of a capacitor 82 to an input terminal 83, to which there are applied negative-going impulses generated by photocell 50 when as previously described, it is illuminated by reflexion from prism 52 at times when a new film frame has fully entered the gate. The circuitry needed to cause such a pulse to be developed by photocell 50 is completely conventional and is not thought to need description. The application of a negative-going pulse to the cathode of diode 80 reduces the potential at the grid of valve 75 below that on the grid of valve 74, so that valve 75 is cut off and valve 74 conducts. The negative-going potential change at the anode of valve 74 is applied by way of a capacitor 84 to the grid of valve 75, the potential of which has already been lowered by the negative-going pulse received from photocell 50, thus keeping that valve cut off and giving rise to a positive-going pulse at its anode. Even though the pulse from photocell 50 terminates, this condition persists until capacitor 84 discharges sufficiently to allow valve 75 to pass current, when the quiescent condition of the circuit is rapidly restored.

The positive pulse arising at the anode of valve 75 is applied by way of a lead 85 to the mixer amplifier 41 shown in the lower part of FIGURE 7 and also by way of a capacitor 87 and a resistor 88 to the grid of valve 72 at which it appears as differentiated positive- and negative-going spikes. This valve is already conductive, so that the differentiated, positive-going spike applied to it has no effect. When the pulse generator circuit comprising valves 74, 75 reverts to its quiescent condition the negative-going spike which results at the grid of valve 72 causes that valve to be cut off and restores that circuit also to its quiescent condition.

The mixer amplifier 41 shown in the lower part of FIGURE 7 comprises a pair of cathode-coupled valves 89, 90. The error signal derived from amplifier 20 is received at an input terminal 91 and applied to the gird of valve 89, while the flyback pulses developed in the upper part of the circuit are applied to the grid of valve 90. The two sets of signals appear mixed at the anode of valve 90 and are fed out by way of an output terminal 92 to deflector control amplifier 10.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

I claim:
1. Apparatus for deriving television signals from perforated motion picture film, said apparatus comprising, in combination, a film gate provided with an aperture, transport mechanism for moving film continuously through said gate, cathode ray tube apparatus including frame-scanning coils for scanning an area by a light spot moving in a predetermined repetitive pattern of scanning lines, optical means including a reflector for forming an image of said scanned area upon a frame of film in said film gate, a photocell associated with said film gate to receive light from said aperture, circuit means including said photocell for developing a television video signal, deflector means controlled by the passage therethrough of an electric current for varying the angular position of said reflector so as to alter the longitudinal position in said scanning gate of said image, a light source, screen means for restricting light from said source to illuminate a marginal portion only of said film including at least one perforation, an apertured mask forming one side of an otherwise opaque enclosure, a sensing photocell within said enclosure and thus exposed only to light from said source passing through the aperture in said mask, optical means including said reflector for projecting an image of said illuminated marginal portion of said film upon said mask so that the illumination of said photocell varies with the position upon said mask of the image of said perforation, means connected to respond to changes of current in said sensing photocell and to produce therefrom an error signal, an amplifier yielding an output current proportional in magnitude and corresponding in polarity to the amplitude and polarity of an input signal, means for applying said error signal to the input of said amplifier, means for applying said output current to said deflector means, a shift amplifier yielding a shift current proportional to an input voltage, means for applying said error signal to the input of said shift amplifier, means for feeding said shift current to said frame-scanning coils to produce a corresponding shift of said scanned area on the screen of said cathode ray tube so as to cause the image of said illuminated marginal portion of said film to be held substantially stationary upon said mask and said image of said scanned area to be held in register with said frame of said film, circuit means operative at the end of a repetition of said pattern of scanning lines to develop a stepping current of predetermined magnitude, and means for applying said stepping current to said deflector means to change the position of said image on said film by an integral number of film frames.

2. Apparatus for deriving television signals from perforated motion picture film, said apparatus comprising, in combination, a film gate provided with an aperture, transport mechanism for moving film continuously through said gate, cathode ray tube apparatus including frame-scanning coils for scanning a stationary area by a light spot moving in a predetermined repetitive pattern of scanning lines, optical means including a reflector for forming an image of said stationary area upon the film in said film gate, a photocell associated with said film gate to receive light from said aperture, circuit means associated with said photocell to develop a television video signal, deflector means controlled by the passage therethrough of an electric current for varying the angular position of said reflector so as to alter the longitudinal position in said gate of said image, a sprocket the teeth of which engage the perforations in said film, a plurality of fiducial elements equiangularly spaced upon said sprocket, a light source illuminating at least one of said fiducial elements, a mask pierced by an aperture and forming one side of an otherwise opaque enclosure, a sensing photocell within said enclosure and thus exposed only to light from said source passing through the aperture in said mask, optical means including said reflector for projecting an image of said illuminated fiducial element upon said mask so that the illumination of said photocell varies with the position upon said mask of the image of said fiducial element, amplifier means connected to respond to changes of current in said photocell and to produce therefrom an error signal, an amplifier yielding an output current proportional in magnitude and corresponding in polarity to the amplitude and polarity of an input signal, means for applying said error signal to the input of said amplifier, means for applying said output current to said deflector means, a shift amplifier yielding a shift current proportional to an input voltage, means for applying said error signal to the input of said shift amplifier, means for feeding said shift current to said frame-scanning coils to produce a corresponding shift of said scanned area on the screen of said cathode ray tube so as to cause the image of said fiducial element to be held substantially stationary upon said mask and said image of said stationary area to be held in register with said frame of said film, means operative at the end of a repetition of said pattern of scanning lines to develop a stepping current of predetermined magnitude, and means for applying said stepping current to said deflector means to change the position of the said image on said film by an integral number of film frames.

3. Apparatus for deriving television signals from perforated motion picture film, said apparatus comprising, in combination, a film gate provided with an aperture, transport mechanism for moving film continuously through said gate, cathode ray tube apparatus including frame-scanning coils for scanning an area by a light spot moving in a predetermined repetitive pattern of scanning lines, optical means including a reflector for forming an image of said scanned area upon film in said film gate, a photocell associated with said film gate to receive light from said aperture, circuit means including said photocell for developing a television video signal, deflector means controlled by the passage therethrough of an electric current for varying the angular position of said reflector so as to alter the longitudinal position in said scanning gate of said image, a light source arranged to illuminate a marginal portion only of said film including at least one perforation, two otherwise opaque enclosures having one wall of each pierced by an aperture, said enclosures being so disposed that said apertured walls are co-planar and said apertures are adjacent to form a mask, a sensing photocell within each of said enclosures and thus arranged to be illuminated only by light from said source which passes through a respective one of said apertures, optical means including said reflector for projecting an image of said illuminated marginal portion of said film including said perforations upon said mask so that the differential illumination of said photocells varies with the position upon said mask of the image of said perforation, a deflection amplifier connected to respond to changes in the currents passed by said photocells to yield an error signal, circuit means responsive to said error signal to yield an amplified current varying in like manner, means for applying said amplified current to said deflector means, a shift amplifier yielding a shift current proportional to an input voltage, means for applying said error signal to the input of said shift amplifier, means for feeding said shift current to said frame-scanning coils to produce a corresponding shift of said scanned area on the screen of said cathode ray tube so as to cause the image of said illuminated marginal portion of said film to be held substantially stationary upon said mask and said image of said stationary area to be held in register with said film, means operative at the end of a repetition of said pattern of scanning lines to develop a stepping current of predetermined magnitude, and means for applying said stepping current to said deflector means to change the position of the said image on said film by an integral number of film frames.

4. Apparatus for deriving television signals from perforated motion picture film, said apparatus comprising, in combination, a film gate provided with an aperture, transport mechanism for moving film continuously through said gate, cathode ray tube apparatus including frame-scanning coils for scanning a stationary area by a light spot moving in a predetermined repetitive pattern of scanning lines, optical means including a reflector for forming an image of said stationary area upon the film in said film gate, a photocell associated with said film gate to receive light from said aperture, circuit means including said photocell for developing a television video signal, deflector means controlled by the passage therethrough of an electric current for varying the angular position of said reflector so as to alter the longitudinal position in said scanning gate of said image, a sprocket the teeth of which engage the perforations in said film, a plurality of fiducial elements equiangularly spaced upon said sprocket, a light source illuminating at least one of said fiducial elements, two otherwise opaque enclosures having one wall of each pierced by an aperture, said enclosures being so disposed that said apertured walls are co-planar and said apertures are adjacent to form a mask, a sensing photocell within each enclosure and thus arranged to be illuminated only by light from said source which passes through a respective one of said apertures, optical means including said reflector for projecting an image of said illuminated fiducial element upon said apertures so that said photocells are differentially illuminated in accordance with the position upon said mask of the image of said fiducial element, circuit means connected to respond to differential changes in current in said sensing photocells to develop an error signal, an amplifier yielding an output current proportional in amplitude and corresponding in polarity to the amplitude and polarity of said error signal, means for applying said output current to said deflector means, a shift amplifier yielding a shift current proportional to an input voltage, means for applying said error signal to the input of said shift amplifier, means for feeding said shift current to said frame-scanning coils to produce a corresponding shift of said scanned area on the screen of said cathode ray tube so as to cause the image of said fiducial element to be held substantially stationary upon said mask and said image of said stationary area to be held in register with said film, means operative at the end of a repetition of said pattern of scanning lines to develop a stepping current of predetermined magnitude, and means for applying said stepping current to said deflector means to change the position of said image on said film by an integral number of film frames.

5. Apparatus for deriving television signals from perforated motion picture film, said apparatus comprising, in combination, a film gate provided with an aperture, transport mechanism for moving film continuously through said gate, cathode ray tube apparatus including frame-scanning coils for scanning a stationary area by a light spot moving in a predetermined repetitive pattern of scanning lines, optical means including a reflector for forming an image of said stationary area upon the film in said film gate, a photocell associated with said film gate to receive light from said aperture, circuit means including said photocell for developing a television video signal, deflector means controlled by the passage therethrough of an electric current for varying the angular position of said reflector so as to alter the longitudinal position in said scanning gate of said image, a sprocket the teeth of which engage the perforations in said film, a plurality of fiducial elements equiangularly spaced upon said sprocket, a light source illuminating at least one of said fiducial elements, an apertured mask forming one side of an otherwise opaque enclosure, a first sensing photocell within said enclosure and thus exposed only to light from said source which passes through the aperture in said mask, a second sensing photocell exposed only to light received directly from said source, optical means including said reflector for projecting an image of said illuminated fiducial element upon said mask so that said sensing photocells are differentially illuminated in accordance with the position upon said mask of the image of said fiducial element, circuit means connected to respond to changes in the currents passed by said sensing photocells by developing an error signal, an amplifier yielding an output current proportional in amplitude and corresponding in polarity to the amplitude and polarity of an input signal, means for applying said error signal to the input of said amplifier, means for applying said output current to said deflector means, a shift amplifier yielding a shift current proportional to an input voltage, means for applying said error signal to the input of said shift amplifier, means for feeding said shift current to said frame-scanning coils to produce a corresponding shift of said scanned area on the screen of said cathode ray tube so as to cause the image of said fiducial element to be held substantially stationary upon said mask and said image of said stationary area to be held in register with said film, means operative at the end of a repetition of said pattern of scanning lines to develop a stepping current of predetermined magnitude, and means for applying said stepping current to said deflector means to change the position of the said image on said film by an integral number of film frames.

References Cited in the file of this patent

UNITED STATES PATENTS

| | | |
|---|---|---|
| 2,666,357 | Graham | Jan. 19, 1954 |
| 2,843,006 | Tyler | July 15, 1958 |